(12) United States Patent
Clucas et al.

(10) Patent No.: US 10,081,428 B2
(45) Date of Patent: Sep. 25, 2018

(54) AIRCRAFT SEAT

(71) Applicant: RECARO Aircraft Seating GmbH & Co. KG, Schwaebisch Hall (DE)

(72) Inventors: Daniel William Clucas, London (GB); Ali Ersan, London (GB)

(73) Assignee: RECARO Aircraft Seating GmbH & Co. KG, Schwaebisch Hall (DE)

( * ) Notice: Subject to any disclaimer, the term of this patent is extended or adjusted under 35 U.S.C. 154(b) by 37 days.

(21) Appl. No.: 14/889,183

(22) PCT Filed: Apr. 25, 2014

(86) PCT No.: PCT/EP2014/001109
§ 371 (c)(1),
(2) Date: Nov. 5, 2015

(87) PCT Pub. No.: WO2014/180538
PCT Pub. Date: Nov. 13, 2014

(65) Prior Publication Data
US 2016/0083094 A1    Mar. 24, 2016

(30) Foreign Application Priority Data

May 7, 2013 (DE) .......... 10 2013 007 731
Jul. 11, 2013 (DE) .......... 10 2013 011 514

(51) Int. Cl.
*B64D 13/00*    (2006.01)
*B64D 11/06*    (2006.01)

(52) U.S. Cl.
CPC .......... *B64D 11/0601* (2014.12); *B64D 11/06* (2013.01); *B64D 11/0604* (2014.12);
(Continued)

(58) Field of Classification Search
CPC . B64D 11/06; B64D 11/0601; B64D 11/0641; B64D 11/0606; B64D 11/0604;
(Continued)

(56) References Cited

U.S. PATENT DOCUMENTS

D598,666 S  *  8/2009  Cloet ............................ D6/356
8,011,723 B2 *  9/2011  Park ....................... B60N 2/345
                                                            244/118.6
(Continued)

FOREIGN PATENT DOCUMENTS

EP     1 648 767 B1    5/2011
GB       907472       10/1962
(Continued)

OTHER PUBLICATIONS

Office Action dated Feb. 6, 2014 issued in corresponding DE patent application No. 10 2013 011 514.0 (and partial English translation).
(Continued)

*Primary Examiner* — Richard G Davis
(74) *Attorney, Agent, or Firm* — Posz Law Group, PLC (57) ABSTRACT

An aircraft seat with a seat zone comprising a seat surface and a backrest and extending in a viewing direction frontward from the backrest over the seat surface along a longitudinal seat axis, and with a console, which is arranged laterally of the seat zone and in the interior space of which a foot space is implemented that is open counter to the viewing direction toward the rear side of the backrest and extends with a frontward insert direction along a longitudinal foot space axis, wherein the seat zone and the foot space are arranged at an angle to each other.

32 Claims, 5 Drawing Sheets (52) U.S. Cl.
CPC ...... *B64D 11/0605* (2014.12); *B64D 11/0606* (2014.12); *B64D 11/0636* (2014.12); *B64D 11/0641* (2014.12)

(58) Field of Classification Search
CPC .............. B64D 11/0643; B64D 11/064; B64D 11/0646; B64D 11/00153; B64D 11/0636
See application file for complete search history.

(56) References Cited

U.S. PATENT DOCUMENTS

| | | | | |
|---|---|---|---|---|
| D696,524 S | * | 12/2013 | Ersan | D6/356 |
| 2009/0146004 A1 | * | 6/2009 | Plant | B64D 11/06 244/118.5 |
| 2012/0292957 A1 | * | 11/2012 | Vergnaud | B64D 11/06 297/188.08 |
| 2013/0032668 A1 | * | 2/2013 | Foucher | B64D 11/06 244/118.6 |
| 2013/0106156 A1 | * | 5/2013 | Orson | B64D 11/06 297/217.3 |

FOREIGN PATENT DOCUMENTS

| | | |
|---|---|---|
| WO | 03/013903 A1 | 2/2003 |
| WO | 2010/100500 A2 | 9/2010 |
| WO | 2012/140515 A1 | 10/2012 |
| WO | 2013/063598 A2 | 5/2013 |
| WO | 2013/063599 A1 | 5/2013 |

OTHER PUBLICATIONS

International Preliminary Report on Patentability dated Nov. 10, 2015 issued in corresponding International Application No. PCT/EP2014/001109 (and English translation).
International Search Report of the International Searching Authority dated Jul. 29, 2014 issued in the corresponding International application No. PCT/EP2014/001109 (and English translation).
Written Opinion of the International Searching Authority dated Jul. 29, 2014 issued in the corresponding International application No. PCT/EP2014/001109 (and English translation).
Office action dated Mar. 27, 2018 issued in corresponding EP patent application No. 14 725 358.7.

* cited by examiner

AIRCRAFT SEAT

CROSS REFERENCE TO RELATED APPLICATIONS

This application is a U.S. national stage application of PCT/EP2014/001109 filed on Apr. 25, 2014, which is based on German Patent Applications No. 10 2013 007 731.1 filed on May 7, 2013 and No. 10 2013 011 514.0 filed on Jul. 11, 2013, the contents of which are incorporated herein by reference.

The invention relates to an aircraft seat with a seat zone comprising a seat surface and a backrest and extending from the backrest in a viewing direction frontward, over the seat surface along a longitudinal seat axis, and with a console, which is arranged laterally of the seat zone and in the interior space of which a foot space is implemented that is open counter to the viewing direction towards the rear side of the backrest and extends with a frontward insert direction along a longitudinal foot space axis. The invention further relates to an aircraft seat arrangement with a first aircraft seat of this kind and a second aircraft seat of this kind, wherein the second aircraft seat is arranged subsequently to the first aircraft seat, along a stacking axis, in such a way that the foot space in the console of the first aircraft seat can be used by a passenger of the seat zone of the second aircraft seat. The invention further relates to an aircraft seat sequence with a plurality of such seat arrangements. Furthermore the invention relates to a seat configuration with a plurality of seat sequences of this kind.

An aircraft seat of the type mentioned above as well as a seat arrangement, a seat sequence and a seat configuration with aircraft seats of the type mentioned above are known, for example, from EP 1 648 767 B1. The seat zone of an aircraft seat can be traversed, in particular with the seat surface being enlarged into a lying surface, from an upright sitting position into a horizontal lying position. In an aircraft seat arrangement, along a stacking axis, behind a first aircraft seat there is a second aircraft seat arranged transversely offset to the stacking axis in such a way that the foot space in the console of the first aircraft seat can be used by a passenger on the seat surface of the second aircraft seat. The seat surface of the second aircraft seat is arranged in stacking direction behind the console of the first aircraft seat and the console of the second aircraft seat is arranged behind the seat zone of the first aircraft seat. After conversion of the seat zone of the second aircraft seat into a horizontal lying position, a partial region of the formed lying surface of the second aircraft seat extends into the foot space of the console of the first aircraft seat.

In an aircraft seat according to EP 1 648 767 B1, a space in a console arranged laterally adjacent to the seat zone is used as a foot space for a passenger of the seat surface of a subsequent further aircraft seat. In particular, in a lying position of the seat zone the lying surface of the rear aircraft seat extends into the foot space of the console of the front aircraft seat. This allows increasing the aircraft seat density along the stacking axis while preserving a comfort for the individual passenger. The leg space of a passenger of a rear aircraft seat or the lying surface of a rear aircraft seat overlaps with the seat zone of a front aircraft seat laterally respectively transversely with respect to the stacking axis.

A similar implementation of an aircraft seat and a similar arrangement respectively sequence of aircraft seats is also known from GB 907472. Here the aircraft seats and consoles are respectively arranged inclined with respect to the stacking direction. Aircraft seats and consoles are arranged along the stacking direction respectively offset to each other.

Furthermore from WO 2010/100500 A2 an arrangement of aircraft seats is known wherein a foot support lateral of the seat surface of an aircraft seat, which is frontward with respect to a stacking direction, can be used by a passenger of the seat surface of a rear aircraft seat, respectively, in case of a lying functionality, becomes part of the lying surface of the rear aircraft seat. The aircraft seats are in this case respectively angled or inclined in parallel with the stacking axis.

Furthermore, in WO 2013/063599 A1 an arrangement of aircraft seats is proposed in which the foot space usable for a passenger of the seat surface of a rear aircraft seat or a functionally converted lying surface of the seat zone of a rear aircraft seat extends along a stacking axis to laterally adjacent to the seat zone of a front aircraft seat. Herein the longitudinal seat axes of two aircraft seats that are arranged along the stacking axis one behind the other include an angle that is open in viewing direction frontward. A respective front aircraft seat and a respective rear aircraft seat are connected to form a unit. A foot support at a lateral console of a first front aircraft seat is usable for a passenger of the seat surface of an, along the stacking axis, third rear aircraft seat.

The density and thus the possible absolute number of aircraft seats in a passenger space of an aircraft, in particular also regarding premium seating or transport classes, is crucial regarding economic aspects of aircraft operation. However, for the passengers there should be no diminishment of comfort due to increasing the number of aircraft seats per area.

The invention is hence based on the objective to improve an aircraft seat of the type mentioned in the introduction in such a way that an aircraft seat arrangement results with the best possible density and with the best possible amount of passenger comfort. Further objectives of the invention are an accordingly improved aircraft seat arrangement, an accordingly improved aircraft seat sequence and an accordingly improved aircraft seat configuration.

As a solution for the first objective, for an aircraft seat with a seat zone comprising a seat surface and a backrest and extending, in a viewing direction from the backrest frontward, over the seat surface along a longitudinal seat axis, and with a console, which is arranged laterally of the seat zone and in the interior space of which a foot space is implemented that is open counter to the viewing direction towards the rear side of the backrest and extends with a frontward insert direction along a longitudinal foot space axis, the invention offers an arrangement of the seat zone and the foot space in such a way that they are arranged at an angle to each other.

The invention is herein based, in a first step, on the fact that in an arrangement of aircraft seats along a stacking axis the aircraft seat density can be increased by arranging the aircraft seats respectively inclined to the stacking axis. The projection of the seat length onto the stacking axis is shortened. The length principally available to a passenger is not shortened by this measure.

In a second step the invention starts from the fact that the density of the aircraft seats in an arrangement can be further increased by the foot space of an along the stacking axis rear aircraft seat laterally overlapping with the seat zone of a front aircraft seat. The length principally available to a passenger is not shortened by this measure either. In particular, while preserving comfort, a lying surface may also be made available, resulting for example from a functional conversion of the seat zone and respectively extending from a rear aircraft seat to laterally next to the seat zone of a front aircraft seat.

In a third step the invention then realizes that in an arrangement of aircraft seats along a stacking axis, a further option for increasing the aircraft seat density results from arranging the seat zone of a front aircraft seat and the foot space of a rear aircraft seat in such a way that they are at an angle to each other. The aircraft seat density along the stacking axis is increased in this case as well, as the projection of a respective length onto the stacking axis can be shortened for each aircraft seat and for each console, as a result of which there is a densified "packing" of aircraft seats along the stacking axis. However, in a seat arrangement along a stacking axis, the opposite angling of seat zone and console respectively footspace results in a respectively alternating inclination of the seat zones and consoles in subsequent aircraft seats in such a way that the seat zone of a rear aircraft seat is oriented to the console of the front aircraft seat. While, in case of a mere parallel offset of aircraft seats which are angled to a stacking axis, the length of the lateral overlap region between subsequent aircraft seats cannot be chosen independently from the inclination angle, this is not the case in an alternating angling of subsequent aircraft seats. The proposed aircraft seat thus allows further increasing the density, i.e. the number of possible aircraft seats per area.

The foot space usable for a passenger of a rear aircraft seat is formed by an in viewing direction lateral console at the seat zone of a front aircraft seat. Thus for the passenger of the aircraft seat, in viewing direction in front of the console, a pass-through region is made available, which is preserved independently from the functional conversion of a seat surface into a lying surface. This contributes to a high degree of sitting comfort.

Neither of respectively the longitudinal seat axis and the longitudinal foot space axis necessarily corresponds to a position of an angle bisectrix or a symmetry axis regarding the respective lateral delimiting walls of the seat zone respectively the foot space. The exact orientation and position is herein given by the respective geometry of the seat zone respectively the foot space. However, the longitudinal seat axis and the longitudinal foot space axis always extend in line with and not transversely to the viewing direction. In particular, however, the longitudinal seat axis and the longitudinal foot space axis may correspond to a mirror axis, with respect to which the seat zone respectively the foot space or the console are embodied in mirror symmetric fashion.

It has been realized that with the aircraft seats according to the features mentioned above the distance between the aircraft seats along the stacking axis can be reduced to less than 117 cm (46 inches), in particular to 104 cm (41 inches) without the comfort for the passengers being significantly reduced.

If the longitudinal seat axis and the longitudinal foot space axis include an angle that is open in viewing direction rearwards, the intersection point of the longitudinal seat axes of the rear and the front aircraft seats is located in a region of the front aircraft seat, resulting in some disadvantages regarding comfort. This results, for example, due to the foot space tapering inwards, in an increasing lateral narrowing of the seat zone in viewing direction frontward, which cannot be compensated by a respective construction of the console. Therefore the longitudinal seat axis and the longitudinal foot space axis preferably include an angle that is open in viewing direction frontward. In this case the intersection point of the longitudinal seat axes of a front aircraft seat and a rear aircraft seat is located in a region of the rear aircraft seat. This allows enlarging the seat zone frontward by a console that extends laterally outwards. The console or the foot space and the seat zone in this case form a wedge opening frontward.

Advantageously the foot space extends in viewing direction frontward beyond the backrest and ends, transversely to the longitudinal seat axis, laterally to the seat surface. This allows an arrangement of aircraft seats along a stacking axis that is as dense as possible, while preserving, in viewing direction in front of the console, a pass-through region that is as large as possible.

In a further preferred exemplary embodiment the foot space of the console is delimited towards the seat zone by an interior wall that includes an angle with the longitudinal seat axis that is open in viewing direction frontward. By such an interior wall the insert direction of the foot space is considered in such a way that the foot space comfort zone felt by a passenger is not reduced.

The interior wall of the foot space expediently also delimits the seat zone towards the foot space at least sectionally. Due to the angling of the interior wall with respect to the longitudinal seat axis being open frontward this results in a laterally enlarged comfort zone for a passenger of the aircraft seat in the seat zone.

The additional space allowed in the seat zone by the interior wall of the foot space being angled frontward with respect to the longitudinal seat axis is advantageously used for arranging a stowage compartment. Preferably this stowage compartment extends downward laterally next to the seat surface, while the space above the stowage compartment remains free for enlarging a free arm space to the interior wall of the foot space.

Further advantageously, the interior wall extends with a partial region in a vertical direction upwards beyond the seat surface, wherein an arm support is arranged at this partial region. Thus a region with a high degree of free arm space and with an ergonomic arrangement of the armrest has been created above the seat surface.

In a further preferred embodiment the foot space of the console is delimited, on the side facing away from the seat zone, by an exterior wall including with the longitudinal seat axis an angle that is open in view direction frontward. In this way the insert direction of the foot space is also considered regarding the exterior wall. For a passenger using the foot space the comfort zone felt in the foot space is not diminished by a wall oriented in this way. The exterior wall itself does not obstruct insertion in the foot space.

The exterior wall and the interior wall expediently extend towards each other in viewing direction frontward, thus tapering the foot space. While preserving an as great as possible comfort in the foot space, thus the construction space of the console is taken into account. The dimension of the console transversely to the longitudinal seat axis can be reduced if the exterior wall of the console extends toward the interior wall of the console in view direction frontward.

Advantageously the seat zone can be traversed from an upright sitting position into a horizontal lying position along an advance direction. In the lying position the seat surface in particular embodies at least a partial region of the lying surface created. Further partial regions of the lying surface may be implemented by the down-folded backrest or by a down-folded leg support. The functional conversion of the seat surface into a lying surface is in particular desirable for aircraft seats of premium passenger classes to allow the passenger to achieve a comfortable sleeping position, for example in long-distance flights. For introducing the lying surface of a rear aircraft seat into the foot space implemented by the console of a front aircraft seat at least at its foot end, the lying surface expediently has—as regards respectively the same aircraft seat—at least at its foot end a glide mirror symmetry with respect to the cross section area of the foot space. This glide mirror symmetry in particular concerns at least the foot end of a down-foldable leg support if this is provided.

Preferably in viewing direction behind the backrest of the aircraft seat a substantially vertical rear wall is provided, which extends in particular arc-shaped with a bridge region laterally across the foot space. By such a rear wall a private space is created for a respective passenger of the aircraft seat. In particular, a direct view of the foot space of a rear aircraft seat is blocked from a passenger of a front aircraft seat. By a substantially arc-shaped implementation of the rear wall a highly aesthetic general impression of the aircraft seat is achieved. Moreover a passenger of a rear aircraft seat perceives the thus implemented rear wall of a front aircraft seat as a delimiting wall of his own private space. In particular, the foot space is regarded as part of one's own private space and not as part of the console of a front aircraft seat.

The bridge region of the rear wall which extends over the console is preferably also usable for the arrangement of utility elements, operating elements or information elements for a rear passenger. A pivotable display unit is expediently inserted in the bridge region of the rear wall above the foot space. Advantageously the display unit fills in its in-pivoted position the surface of the bridge region to a main part, i.e. by more than 50%, of the surface of the bridge region. In this case the surface of the bridge region is mostly used to create a large display region, which is generally appreciated by passengers.

In the foot space of the console a foot support is expediently arranged. In an upright position of the seat zone of a rear aircraft seat this foot support may be comfortably used by a passenger of a rear aircraft seat for putting his feet on it. When the seat surface is functionally converted into a lying surface, the enlarged seat surface of the rear aircraft seat advantageously directly couples to the foot support of the front aircraft seat. Thereby a contiguous lying surface is generated including the foot support.

In a further preferred implementation of the aircraft seat the seat zone and the console are connected via a base frame to form a structural unit. The console may also be coupled to the seat zone via the rear wall. In particular, the rear wall of the seat zone and the console may be manufactured, in partial regions or entirely, as a one-part or multi-part shell element. For transferring the aircraft seat into the passenger space of an aircraft it is convenient in particular to manufacture the seat zone, the console and the rear wall as modules. For assembly of the aircraft seat the modules can then be transferred into the passenger space and can be assembled there respectively connected to each other into the aircraft seat as a unit.

Furthermore the objective posed at the start is solved according to the invention by an aircraft seat arrangement comprising a first aircraft seat of the type described above and a second aircraft seat of the type described above, wherein in the first aircraft seat and in the second aircraft seat the positions of the seat zone and the console have been exchanged, and wherein the second aircraft seat is arranged along a stacking axis, subsequent to the first aircraft seat in such a way that the longitudinal seat axis of the seat zone of the second aircraft seat is oriented toward the foot space of the first aircraft seat.

To put it differently, the positions of the seat zone and of the console alternate along the stacking axis. The seat zone of the second aircraft seat is arranged, with respect to the stacking axis, behind the console of the first aircraft seat. The console of the second aircraft seat is situated, with respect to the stacking axis, behind the seat zone of the first aircraft seat. The longitudinal seat axis of the seat zone of the second aircraft seat is oriented towards the foot space of the first aircraft seat. A passenger of the second aircraft seat can comfortably use the foot space in the console of the first aircraft seat. Advantageously the seat zones and the consoles of the first and second aircraft seats have been respectively exchanged regarding their respective positions with a mirror symmetry. To put it differently, the seat zone and the console of the first and the second aircraft seat arrangement can be transferred one into the other by way of a glide reflection operation. Detail elements, e.g. fastening elements, decorative elements and the like, as well as dimensional deviations due to manufacturing tolerances are not covered by the mirror symmetry. The stacking axis is defined by a middle or symmetry axis extending through the first and second aircraft seats in stacking direction.

The described aircraft seat arrangement supplies the passenger with a comfortable seat zone with a high degree of leg space. The foot space extends laterally next to the seat zone of the first aircraft seat into the console of the first aircraft seat. By the angled arrangement of seat zone and console, a high aircraft seat density is achievable with a high level of comfort. To this purpose a plurality of the above-described seat arrangements is respectively placed along the stacking axis.

If a lying functionality is provided for the seat zone of the aircraft seat, the advance direction of the seat zone of the second aircraft seat does not necessarily have to coincide with the insert direction of the foot space of the first aircraft seat. Neither does the longitudinal seat axis of the seat zone of the second aircraft seat have to coincide with the longitudinal foot space axis of the foot space of the first aircraft seat. The respective directions and axes may in particular also be at an angle to each other. Advantageously, however, the advance direction of the seat zone of the second aircraft seat into a lying position coincides with the insert direction of the foot space of the first aircraft seat. Thus the seat surface of the second aircraft seat, enlarged into a lying surface, can easily extend into the foot space of the console of the first aircraft seat, with the geometry of the enlarged seat surface of the second aircraft seat substantially corresponding to the geometry of the foot space of the first aircraft seat. No restrictions must be made regarding the lying surface.

Advantageously the longitudinal seat axes of the seat zones of the first aircraft seat and of the second aircraft seat respectively include with the stacking axis an angle that is open in viewing direction frontward. In addition to the already described advantages of such an angling towards the front, an angling of the seat zone with respect to the stacking axis generally results in a projection of the seat length onto the stacking axis being shortened and the possible aircraft seat density along the stacking axis being thus increased. The same applies if the longitudinal foot space axes of the foot spaces of the first aircraft seat and of the second aircraft seat respectively include with the stacking axis an angle that is open in viewing direction frontward.

In an expedient implementation the longitudinal seat axes as well as the longitudinal foot space axes of both aircraft seats respectively include with the stacking axis an angle that is open in viewing direction frontward. By this arrangement the greatest possible aircraft seat density along the stacking axis can be achieved.

In a further advantageous exemplary embodiment the interior wall delimiting the foot space of the first aircraft seat extends parallel to the advance direction of the seat zone of the second aircraft seat. In this regard, the lying surface can be continued frontward parallel to the seat surface along the inner contour of the seat zone. In this case, for example, the inner contour of a down-foldable leg support is implemented parallel to the interior wall of the first aircraft seat. This is also a comfort feature.

The objective formulated at the start is further solved, according to the invention, by an aircraft seat sequence in which a first above-described aircraft seat arrangement and a second above-described aircraft seat arrangement are arranged neighboring each other transversely to the stacking axis.

An aircraft seat sequence of this kind has a high packing density and in particular has the advantage that for each passenger, in viewing direction in front of the console of the respective aircraft seat, a pass-through region is made available that is not involved in the lying functionality of the seat zone. In particular, this also respectively results for an "inner" passenger of the seat sequence in a free pass-through region into a lateral aisle, independently from whether the passenger himself or another passenger has functionally converted the seat zone into a lying position.

In the aircraft seat sequence the corresponding aircraft seats of the first and second aircraft seat arrangements are preferentially respectively arranged at the same stacking level. This is, however, not absolutely necessary. There may as well be a lateral offset of the first and second aircraft seat arrangements along the stacking axis.

The aforementioned aircraft seat sequence is in particular convenient for the implementation of a middle row in an aircraft, wherein respectively two aircraft seats are arranged one beside the other transversely to the stacking axis.

In a first embodiment, the positions of the seat zone and the console have been exchanged in the aircraft seats of the first aircraft seat arrangement and of the second aircraft seat arrangement, said aircraft seats being arranged respectively neighboring transversely to the stacking axis. In a second embodiment, the positions of the seat zone and of the console are the same in the respective, transversely to the stacking axis neighboring aircraft seats of the first aircraft seat arrangement and of the second aircraft seat arrangement.

In the first embodiment, the seat zones and the consoles of neighboring aircraft seats are, along the stacking axis, alternatingly directly adjacent to or spaced apart from each other. The first embodiment in this regard additionally provides the advantage of a flight for two individuals in a shared private space. In the second embodiment, the seat zones of all neighboring aircraft seats are respectively separated by a console that is arranged between them. In this regard, this embodiment is in particular suitable for single persons. Each passenger has his own private space.

The objective formulated at the start is further achieved, according to the invention, by an aircraft seat configuration with a middle row, comprising a plurality of aircraft seat sequences of the kind described above, which are arranged along a stacking axis, with a first lateral row that is transversely offset to the stacking axis of the middle row and comprises a plurality of aircraft seat arrangements of the type described above, which are arranged along a stacking axis, and with a second lateral row that is transversely offset to the stacking axis of the middle row and comprises a plurality of aircraft seat arrangements of the type described above, which are arranged along a stacking axis.

An aircraft seat configuration of this kind is expedient for the implementation of three seat rows along a longitudinal axis of an aircraft, wherein the two lateral rows are respectively arranged to the outer side of the aircraft and the middle row is arranged centrally in the passenger space. Aisles may be respectively provided between the respective rows.

Exemplary embodiments are explained in detail by way of a drawing.

It is shown in.

Figure 1:
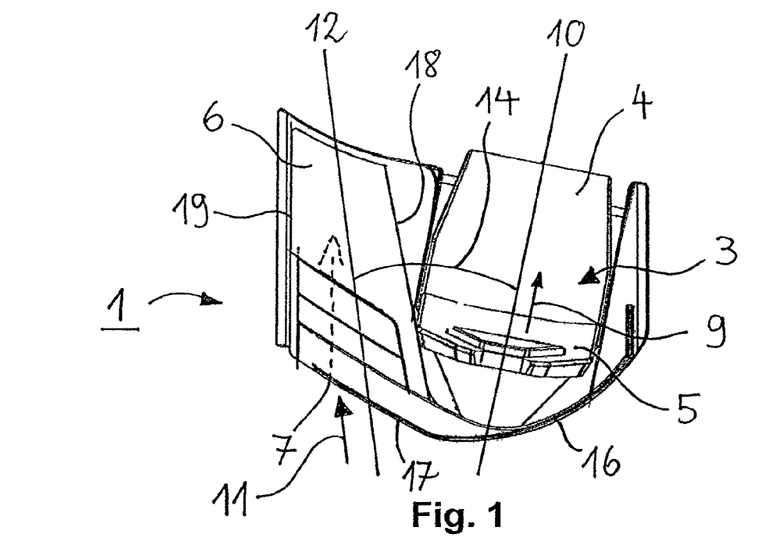
FIG. 1 a top view of an aircraft seat with a seat zone and with a foot space formed in a lateral console, the longitudinal seat axis and the longitudinal foot space axis being at an angle to each other, FIG. 2 the aircraft seat according to FIG. 1 in a perspective view from the front, FIG. 3 the aircraft seat according to FIG. 1 in a perspective view from the rear, FIG. 4 a top view of an aircraft seat arrangement with a first aircraft seat according to FIG. 1 and with a mirror-symmetric second aircraft seat that is arranged behind the first one along a stacking axis, FIG. 5 the aircraft seat arrangement according to FIG. 4 in a perspective view, FIG. 6 a schematic view of a first aircraft seat configuration with aircraft seat arrangements according to FIG. 4, FIG. 7 a schematic view of a second aircraft seat configuration with aircraft seat arrangements according to FIG. 4, and FIG. 8 a schematic view of a third aircraft seat configuration with aircraft seat arrangements according to FIG. 4.

FIG. 1 presents a top view of an aircraft seat 1 with a seat zone 3 comprising a seat surface 4 and a backrest 5, and with a laterally arranged console 6, in the interior space of which a foot space 7 is formed for a rearward passenger.

By the seat zone 3 and in particular by the backrest 5 a viewing direction 9 is defined for the aircraft seat 1. A passenger of the aircraft seat 1 looks into the viewing direction 9 when sitting in an upright position with his head held straight. Furthermore, by the seat zone 3 of the aircraft seat 1 a longitudinal seat axis 10 is given, which is drawn in as the symmetry axis of the seat zone 3. Usually the longitudinal seat axis 10 runs approximately parallel to the viewing direction 9 frontward, away from the backrest 5 in its upright position.

Furthermore, an insert direction 11 is given by the foot space 7 formed in the interior of the console 6. This insert direction 11 corresponds to the direction along which a rear passenger comfortably extends his feet into the foot space 7 of a front aircraft seat 1. Moreover, a longitudinal foot space axis 12 is also given by the implementation of the foot space 7, in particular by its laterally delimiting walls. Here the longitudinal foot space axis 12 is drawn in as the angle bisectrix between the two lateral delimiting walls of the foot space 7. This is, however, not necessarily so. The longitudinal foot space axis 12 extends in line with, not transversely to the viewing direction 9 defined by the seat zone 3.

Figure 4:
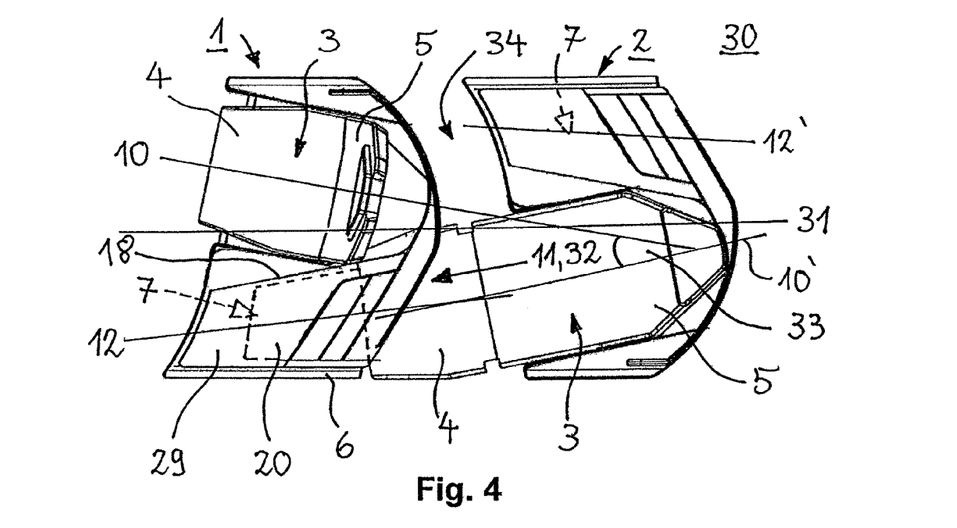

By the the console 6 and the foot space 7 formed therein being arranged laterally next to the seat zone 3, a high density of aircraft seats 1 is achievable in a stacking of aircraft seats 1 along a stacking axis (cf. FIG. 4, reference numeral 31). The leg space respectively foot space respectively required by a rear passenger is partially arranged in a region situated, with respect to the stacking axis 31, laterally next to a front aircraft seat 1.

It can also be seen in FIG. 1 that the seat zone 3 and the foot space 7 of the aircraft seat 1 are arranged at an angle to each other, wherein the longitudinal seat axis 10 and the longitudinal foot space axis 12 include an angle 14 that is open in viewing direction 9 frontward. Due to the angling of the seat zone 3 and the foot space 7, the projection of their respective lengths onto a stacking axis 31 is shortened, as a result of which the density of aircraft seats 1 can be increased.

It is also perceivable in FIG. 1 that the angling shown, with the longitudinal foot space axis 12 and the longitudinal seat axis 10 including an angle 14 that is open in viewing direction 9 frontward, results in a large free space for the passenger in the seat zone 3. In viewing direction 9 frontward, the foot space 7 departs from the seat zone 3. In particular, in the region of the seat surface 4, for example, a large free arm space may be created by implementing the console 6 accordingly. The foot space 7 and the seat zone 3 are arranged in a wedge-shape with respect to each other. The wedge angle 14 is open in viewing direction 9 frontward.

In viewing direction 9 behind the backrest 5, a rear wall 16 is arranged that is approximately arc-shaped and oriented vertically. The rear wall 16 extends with a bridge region 17 laterally from the seat zone 3 over the console 6. The rear wall 16 in particular prevents a passenger of the aircraft seat 1 from having a view into a rear foot space. The rear wall 16 creates a private space for the passenger of the aircraft seat 1.

Figure 2:
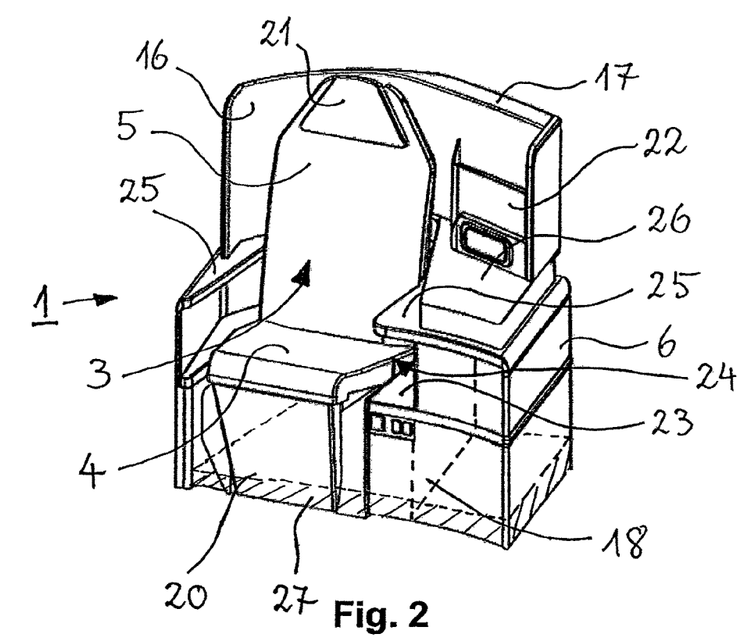
Figure 3:
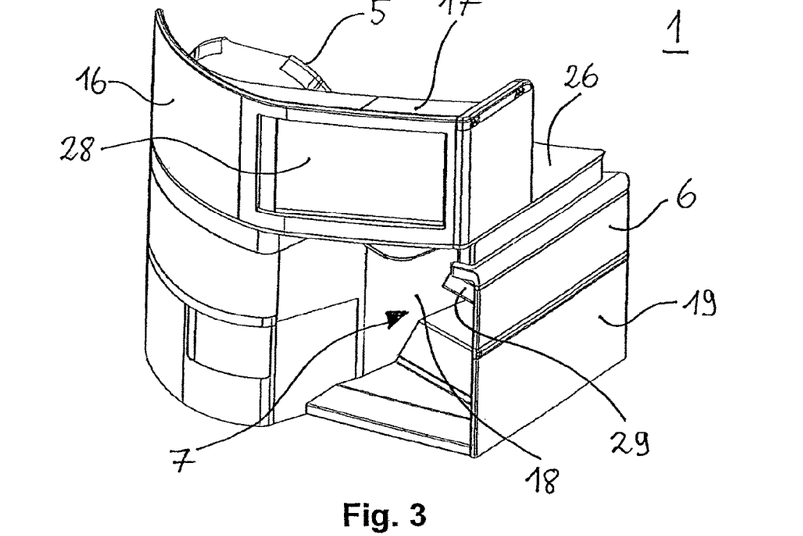

In the top view onto the aircraft seat 1 according to FIG. 1, the upper side of the console 6 can be perceived. The visible delimiting lines of the upper side of the console 6 approximately correspond to the course of the delimiting walls of the foot space 7, which are arranged underneath, as can be seen in FIGS. 2 and 3. The foot space 7 is in this regard delimited by an obliquely extending interior wall 18 and an obliquely extending exterior wall 19. Herein the interior wall 18 as well as the exterior wall 19 of the foot space 7 each include with the longitudinal seat axis 10 an angle that is open in viewing direction 9 frontward. The interior wall 18 and the exterior wall 19 extend toward each other in viewing direction 9 frontward, thus tapering the front space 7.

From the perspective front view of the aircraft seat 1 according to FIG. 2, it is perceivable that the seat zone 3 is provided with a lying functionality. In the upright sitting position shown of the seat zone 3, a down-folded leg support 20 is arranged in front of the seat surface 4. In a functional conversion of the seat zone 3, the seat surface 4 is enlarged by positioning the leg support 20 horizontally to form an enlarged lying surface. Simultaneously the backrest 5 is traversed from the upright position shown into an approximately horizontal lying position. In the lying position thus a uniform lying surface has been implemented by the down-folded leg support 20, by the seat surface 4 and by the down-folded backrest 5. At the upper end of the backrest 5 an adjustable headrest 21 is arranged.

In the perspective view of the aircraft seat 1 according to FIG. 2, the situation of the interior wall 18 delimiting the foot space 7 (cf. FIG. 1) toward the interior to the seat zone 3 is depicted with dashed lines. The interior wall 18 respectively embodies, in partial areas, the delimiting surface both for the foot space 7 and for the seat zone 3.

Above the console 6, for the passenger of the aircraft seat 1 a deposit region 22 is arranged at the front side of the rear wall 16. In the space resulting frontward from the angling of the foot space 7 with respect to the seat zone 3, a stowage compartment 23 is put in laterally and underneath with respect to the seat surface 4, respectively between a seat substructure and the foot space 7. In a partial region 24 situated above the stowage compartment 23, a free arm space extends laterally to the interior wall 18, which is also a delimiting surface for the foot space 7 of the console 6. Above said partial region 24, an arm support 25 is mounted on the console 6. Furthermore a planar deposit area 26 is implemented at the console 6 on the upper side of the console 6. On the side of the seat zone 3 that faces away from the console 6, also an arm support 25 is provided. The two arm supports 25 are situated at the same level.

The seat zone 3 and the console 6 are mounted on a shared base frame 27, via which they are fixedly connected to each other. On the base frame 27 there is also a seat kinematics unit (not shown here) fastened, which is designed for adjusting the seat surface 4, the leg support 20 and the backrest 5. The seat kinematics unit is in particular provided to adjust the seat zone 3 between the shown sitting position and a lying position.

In FIG. 3, which shows the aircraft seat 1 in a perspective view from the rear, it can further be seen that a large-size display unit 28 is arranged on the in view direction 9 rear side of the rear wall 16, in the bridge region 17. The display unit 28 is pivotably mounted in the bridge region 17 and extends almost over the entire area of the bridge region 17.

In the interior of the foot space 7 the interior wall 18 is perceivable, which delimits the foot space 7 inwards to the seat zone 3. The foot space 7 of the console 6 is delimited outwards by the exterior wall 19. In the foot space 7 furthermore a foot support 29 is arranged, which is usable for a rearward passenger. In case of the lying functionality, the leg support 20 of a rear aircraft seat 1, which can be seen in FIG. 2, couples to the foot support 29 that is perceivable in FIG. 3.

In FIG. 4 a top view is presented of an aircraft seat arrangement 30 with a first aircraft seat 1 according to FIG. 2 and with a second aircraft seat 2, which is implemented in a mirror-symmetric fashion thereto. The stacking axis 31 of the shown aircraft seat arrangement 30 is depicted as a central axis. The stacking axis 31 also functions as a symmetry axis. By a glide reflection operation along the stacking axis 31 the first aircraft seat 1 and the second aircraft seat 2 can be transferred into each other. This does not regard detail elements, e.g. decoration elements, fastening elements and the like.

The in viewing direction 9 rear aircraft seat 2 is structured, besides the mirror image construction, corresponding to the first aircraft seat 1. By the mirror image structure the positions of the seat zone 3 and the foot space 7 are exchanged in the first aircraft seat 1 and in the second aircraft seat 2.

It is perceivable that the seat zone 3 of the second aircraft seat 2 is arranged to the rear of the foot space 7 of the first aircraft seat 1. The console 6 respectively the foot space 7 of the second aircraft seat 2 is located to the rear of the seat zone 3 of the first aircraft seat 1. This arrangement allows a passenger of the rear second aircraft seat 2 using the foot space 7 formed in the console 6 of the first aircraft seat 1. In particular, due to the mirror image structure of the aircraft seats 1, 2, the longitudinal seat axis 10' of the seat zone 3 of the rear aircraft seat 2 approximately coincides with the longitudinal foot space axis 12 of the front aircraft seat 1.

The longitudinal seat axes 12, 12' and the longitudinal foot space axes 10, 10' of the front aircraft seat 1 and the rear aircraft seat 2 respectively include with each other and with the stacking axis 31 an angle that is open in viewing direction 9 frontward. The angle 33 between the longitudinal seat axis 10' of the rear second aircraft seat 2 and the longitudinal seat axis 10 of the front first aircraft seat 1 is shown in the drawing.

The seat zone 3 of the rear second aircraft seat 2 is shown in its lying position. The advance direction 32 of the seat zone 3 into a lying position coincides with the insert direction 11 of the foot space 7 of the first aircraft seat 1. The insert direction 11 here extends parallel to the interior wall 18, which separates the foot space 7 from the seat zone 3. The horizontally down-folded leg support 20 of the second aircraft seat 2 extends into the foot space 7 of the console 6 of the first aircraft seat 1. Herein the leg support 20 directly couples to the foot support 29 that is located there. It can be seen that the leg support 20 of the second aircraft seat 2 corresponds in its geometry to the geometry of the foot space 7 of the first aircraft seat 1. Due to the symmetrical implementation of the aircraft seats 1, 2, the leg support 20 of the second aircraft seat 2 presents a glide mirror symmetry to the cross section area of the foot space 7 of the second aircraft seat 2, namely of the same aircraft seat 2.

By the aircraft seat arrangement 30 according to FIG. 4 it is in particular also perceivable that for a passenger of the second aircraft seat 2, in view direction 9 in front of the console 6, a pass-through region 34 is created, which is independent from the conversion of the seat zones 3 in their respective lying position.

Figure 5:
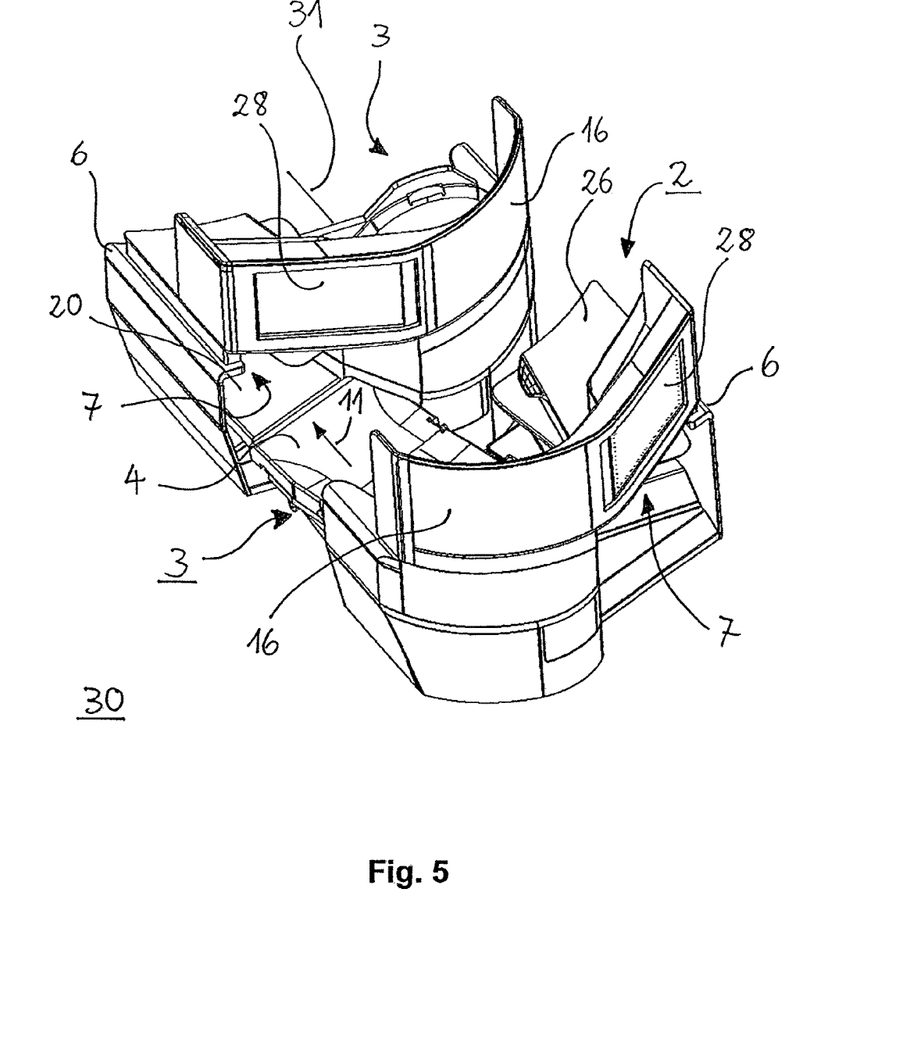

In FIG. 5 the aircraft seat arrangement 30 according to FIG. 4 is shown in a perspective view. The display units 28 respectively inserted in the rear walls 16 can be seen here in detail. It is also perceivable in which way the leg support 20 of the seat zone 3 of the rear aircraft seat 2 extends into the foot space 7 of the first aircraft seat 1. In the rear aircraft seat 2 the deposit area 26 on the console 6 can be seen.

Figure 6:
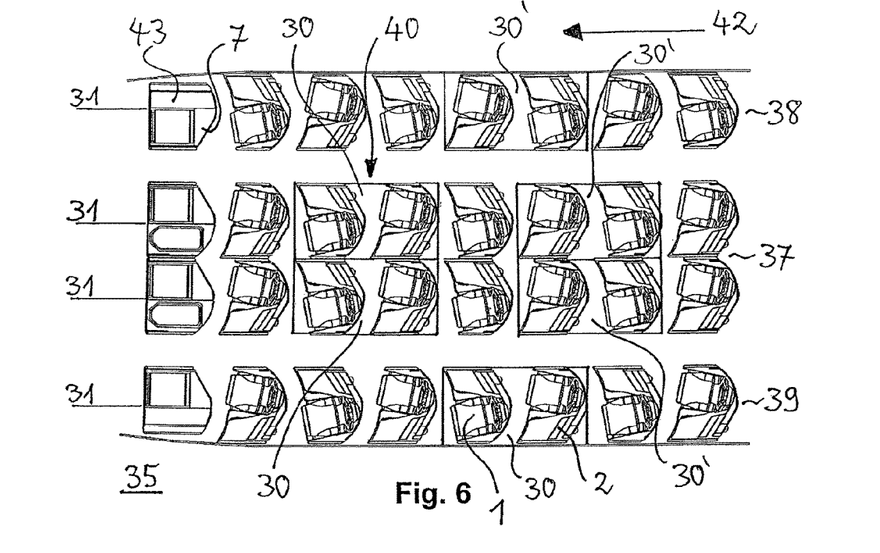
Figure 7:
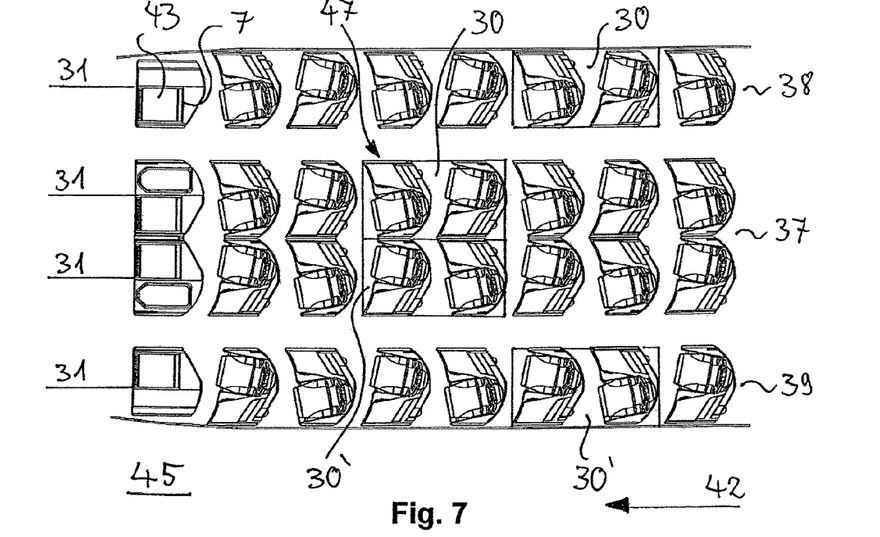
Figure 8:
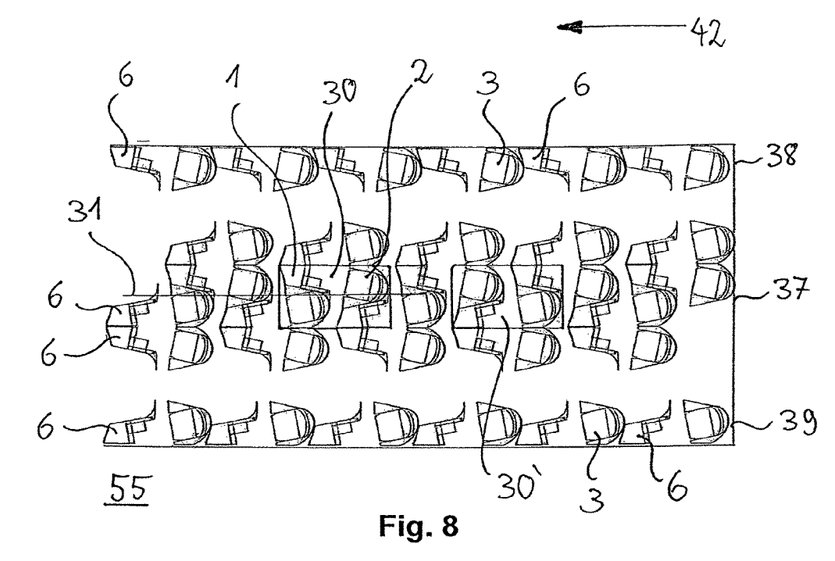

FIGS. 6 to 8 respectively present schematic views of different aircraft seat configurations 35, 45, 55. Each aircraft seat configuration 35, 45, 55 herein comprises a plurality of aircraft seats 1, 2 respectively of aircraft seat arrangements 30 according to FIG. 4, respectively of aircraft seat arrangements 30', wherein the positions of first and second aircraft seats 1, 2 have been exchanged with respect to the aircraft seat arrangement 30 along the respective stacking axis 31. The aircraft seats 1, 2 are herein respectively arranged in a middle row 37 and in two lateral rows 38, 39 along the respective stacking axes 31. The rows 37, 38, 39 are respectively separated from each other by aisles. The longitudinal aircraft axis 42 is shown in the drawing.

The aircraft seat configuration 35 comprises in its middle row 37 a plurality of aircraft seat sequences 40, which are respectively composed of aircraft seat arrangements 30, 30' that are arranged neighboring each other with respect to the respective stacking axis 31. Herein the two aircraft seat arrangements 30, 30' of the middle row 37 are implemented structurally equivalent respectively with respect to the positions of seat zone and console. The two lateral rows 38, 39 are also implemented by a plurality of aircraft seat arrangements 30, 30' which are arranged along the stacking axis 31. Individual front elements 43, each forming a foot space 7 for the passengers of the front aircraft seats, are positioned at the front end of the aircraft seat configuration 35 shown. By the front elements 43 also a deposit facility is created for passengers and for aircraft staff. The deposit facilities are implemented, for example, as deposit compartments, as stowage compartments or as cupboard elements. Preferably a space for the installation of an infant or baby bucket is comprised by the front elements 43.

Due to the respectively equivalent implementation of the aircraft seat arrangements 30, 30', which are arranged neighboring each other in the middle row 37, the respective seat zones are here respectively spaced apart from each other by means of consoles. Each passenger of the middle row 37 has his own private space.

The aircraft seat configuration 45 according to FIG. 7 differs from the aircraft seat configuration 35 according to FIG. 6 in that all aircraft seats are arranged respectively embodied in a mirror-symmetric fashion to each other with respect to a central middle axis.

The middle row 37 accordingly comprises a plurality of aircraft seat sequences 47 consisting of a first aircraft seat arrangement 30 and an aircraft seat arrangement 30' that is arranged laterally adjacent. Accordingly the first and the second aircraft seats 1, 2 of the aircraft seat arrangement 30 and the aircraft seat arrangement 30' are embodied respectively mirror-symmetrically to each other. It can be seen that in the middle row 37 the seat zones and the consoles alternatingly directly abut each other. This has the advantage that two passenger can—if desired—share a private space during the flight. The lateral row 39 also comprises a plurality of aircraft seat arrangements 30'.

In the aircraft seat configuration 55 according to FIG. 8, the two lateral rows 38 and 39 are also constructed with aircraft seats that are arranged in a mirror-symmetric fashion with respect to a central symmetry axis. The aircraft seats are herein respectively implemented by separate seat zones 3 and consoles 6. The middle row 37 comprises a plurality of aircraft seat arrangements 30, 30' wherein, laterally adjacent to a respective one of the aircraft seats 1, 2 with respect to the stacking axis 31, a corresponding single seat zone 3 respectively a single console 6 has been added. A respectively resulting double console can be used by both passengers. This provides respective double seat configurations with a shared private space, which may also be respectively used by two passengers together.

REFERENCE NUMERALS 1,2 aircraft seat
3 seat zone
4 seat surface
5 backrest
6 console
7 foot space
9 viewing direction
10,10' longitudinal seat axis
11 insert direction
12,12' longitudinal foot space axis
14 angle
16 rear wall
17 bridge region
18 interior wall
19 exterior wall
20 support
21 headrest
22 deposit region
23 stowage compartment
24 partial region interior wall
25 arm support
26 deposit area
27 base frame
28 display unit 29 foot support
30,30' aircraft seat arrangement
31 stacking axis
32 advance direction
33 angle
34 (transverse) pass-through region
35 aircraft configuration
middle row
first lateral row
second lateral row
aircraft seat sequence
longitudinal aircraft axis
aircraft seat sequence
front element
aircraft seat configuration

The invention claimed is:

1. An aircraft seat with a seat zone comprising a seat surface and a backrest and extending in a viewing direction frontward from the backrest over the seat surface along a longitudinal seat axis, with a console, which is arranged laterally of the seat zone and in the interior space of which a foot space is implemented that is open counter to the viewing direction toward the rear side of the backrest and extends with a frontward insert direction along a longitudinal foot space axis, and with a vertical rear wall arranged in the viewing direction behind the backrest, wherein
the seat zone and the foot space are arranged at an angle to each other,
the foot space of the console is delimited toward the seat zone by an interior wall,
a stowage compartment is arranged in a space between the seat zone and the interior wall,
the interior wall extends with a partial region in a vertical direction upwards beyond the seat surface, wherein the partial region is situated above the stowage compartment,
an arm support is arranged at the partial region, wherein the arm support is arranged in the space between the seat zone and the interior wall,
the vertical rear wall comprises a bridge region extending laterally across the foot space and a backrest region extending laterally behind the backrest,
the bridge region and the backrest region merge into each other in an arc-shaped manner and
the aircraft seat is configured for use with a rear aircraft seat directly behind the aircraft seat, and an intersection point, in a top view, of the longitudinal seat axis of the aircraft seat and a rear longitudinal seat axis of the rear aircraft seat directly behind the aircraft seat is located in a backrest region of the rear aircraft seat, wherein the rear longitudinal seat axis of the rear aircraft seat approximately coincides with the longitudinal foot space axis.

2. The aircraft seat according to claim 1, wherein the longitudinal seat axis and the longitudinal foot space axis include an angle that is open in the viewing direction frontward.

3. The aircraft seat according to claim 1, wherein the foot space extends in the viewing direction frontward beyond the backrest and ends laterally of the seat surface-transversely to the longitudinal seat axis.

4. The aircraft seat according to claim 1, wherein the interior wall includes an angle with the longitudinal seat axis that is open in the viewing direction frontward.

5. The aircraft seat according to claim 4, wherein the interior wall also delimits the seat zone toward the foot space at least sectionally.

6. The aircraft seat according to claim 1, wherein the foot space of the console is delimited on the side facing away from the seat zone by an exterior wall, which includes with the longitudinal seat axis an angle that is open in the viewing direction frontward.

7. The aircraft seat according to claim 6, wherein the exterior wall and the interior wall extend toward each other in the viewing direction frontward, thus tapering the foot space.

8. The aircraft seat according to claim 1, wherein the seat zone can be transversed from an upright sitting position into a horizontal lying position along an advance direction.

9. The aircraft seat according to claim 8, wherein in the lying position the seat surface embodies at least a partial region of a lying surface formed by the backrest and the seat surface, wherein for introducing the lying surface into a foot space of a front aircraft seat, the lying surface shows at least at its foot end a glide mirror symmetry with respect to the cross section area of the foot space of the front aircraft seat.

10. The aircraft seat according to claim 1, wherein a pivotable display unit is inserted in the bridge region of the vertical rear wall above the foot space.

11. The aircraft seat according to claim 10, wherein the display unit fills a main part of the surface of the bridge region in its in-pivoted position.

12. The aircraft seat according to claim 1, wherein a foot support is arranged in the foot space of the console.

13. The aircraft seat according to claim 1, wherein the seat zone and the console are connected via a base frame to form a structural unit.

14. The aircraft seat according to claim 1, wherein the arm support is arranged at least partially vertically above the stowage compartment.

15. The aircraft seat according to claim 14, wherein in the partial region situated above the stowage compartment, a free arm space extends laterally to the interior wall, which is also a delimiting surface for the foot space of the console.

16. The aircraft seat according to claim 14, wherein a storage surface area of the stowage compartment corresponds to at least 80% of an overall area spanning between the seat surface and the interior wall of the foot space, with the storage surface area and the overall area being parallel to a support surface of the arm support.

17. The aircraft seat according to claim 14, wherein a storage surface of the stowage compartment is generally wedge shaped.

18. The aircraft seat according to claim 17, wherein a support surface of the arm support is generally wedge shaped.

19. An aircraft seat arrangement with a front and rear aircraft seat according to claim 1, the rear aircraft seat positioned directly behind the front aircraft seat.

20. An aircraft seat arrangement with a first and a second aircraft seat according to claim 1, wherein in the first aircraft seat and in the second aircraft seat the positions of the seat zone and the console have been exchanged, and wherein the second aircraft seat is arranged along a stacking axis subsequent to the first aircraft seat in such a way that the longitudinal seat axis of the seat zone of the second aircraft seat is oriented towards the foot space of the first aircraft seat.

21. The aircraft seat arrangement according to claim 20, wherein the seat zone can be traversed from an upright sitting position into a horizontal lying position along an advance direction, which coincides with an insert direction of the foot space of the first aircraft seat, wherein the insert direction corresponds to a direction along which a rear passenger comfortably extends his feet into the foot space.

22. The aircraft seat arrangement according to claim 20, wherein the longitudinal seat axes of the seat zones of the first aircraft seat and of the second aircraft seat respectively include with the stacking axis an angle that is open in the viewing direction frontward.

23. The aircraft seat arrangement according to claim 20, wherein the longitudinal foot space axes of the foot spaces of the first aircraft seat and of the second aircraft seat respectively include with the stacking axis an angle that is open in the viewing direction frontward.

24. The aircraft seat arrangement according to claim 20, wherein the console of the first aircraft seat also implements the foot space for a passenger of the second aircraft seat.

25. An aircraft seat sequence wherein a first and a second aircraft seat arrangement according to claim 20 are arranged neighboring each other transversely to the respective stacking axis.

26. The aircraft seat sequence according to claim 25, wherein the positions of the seat zone and the console have been exchanged in the respectively neighboring aircraft seats of the first aircraft seat arrangement and of the second aircraft seat arrangement.

27. The aircraft seat sequence according to claim 25, wherein the positions of the seat zone and the console are the same in the respectively neighboring aircraft seats of the first aircraft seat arrangement and of the second aircraft seat arrangement.

28. An aircraft seat configuration, comprising
a middle row comprising a plurality of aircraft seat sequences according to claim 25, which are arranged along a stacking axis,
a first lateral row that is transversely offset to the stacking axis of the middle row and comprises a plurality of aircraft seat arrangements, which are arranged along a stacking axis, and
a second lateral row that is transversely offset to the stacking axis of the middle row and comprises a plurality of aircraft seat arrangements, which are arranged along a stacking axis.

29. An aircraft seat with a seat zone comprising a seat surface and a backrest and extending in a viewing direction frontward from the backrest over the seat surface along a longitudinal seat axis, with a console, which is arranged laterally of the seat zone and in the interior space of which a foot space is implemented that is open counter to the viewing direction toward the rear side of the backrest and extends with a frontward insert direction along a longitudinal foot space axis, with an interior wall delimiting the foot space of the console toward the seat zone and with an arm support,
wherein the seat zone and the foot space are arranged at an angle to each other,
wherein the interior wall includes an angle with the longitudinal seat axis that is open in viewing direction frontward,
wherein the interior wall extends with a partial region in a vertical direction upwards beyond the seat surface,
wherein the arm support is arranged at the partial region and is mounted on the console, and
the aircraft seat is configured for use with a rear aircraft seat directly behind the aircraft seat, and an intersection point, in a top view, of the longitudinal seat axis of the aircraft seat and a rear longitudinal seat axis of the rear aircraft seat directly behind the aircraft seat is located in a backrest region of the rear aircraft seat, wherein the rear longitudinal seat axis of the rear aircraft seat approximately coincides with the longitudinal foot space axis.

30. An aircraft seat with a seat zone comprising a seat surface and a backrest and extending in a viewing direction frontward from the backrest over the seat surface along a longitudinal seat axis, with a console, which is arranged laterally of the seat zone and in the interior space of which a foot space is implemented that is open counter to the viewing direction toward the rear side of the backrest and extends with a frontward insert direction along a longitudinal foot space axis, wherein
the seat zone and the foot space are arranged at an angle to each other,
the foot space extends counter to the viewing direction rearward beyond the backrest, and
the aircraft seat is configured for use with a rear aircraft seat directly behind the aircraft seat, and an intersection point, in a top view, of the longitudinal seat axis of the aircraft seat and a rear longitudinal seat axis of the rear aircraft seat directly behind the aircraft seat is located in a backrest region of the rear aircraft seat, wherein the rear longitudinal seat axis of the rear aircraft seat approximately coincides with the longitudinal foot space axis.

31. The aircraft seat according to claim 30, wherein the foot space in the viewing direction is at least partially located behind the seat surface and/or the backrest.

32. The aircraft seat according to claim 30, wherein
the seat zone can be transversed from an upright sitting position into a horizontal lying position along an advance direction, and
the foot space ends laterally of a head-rest-surface of a headrest at the upper end of the backrest in the horizontal lying position.

* * * * *